Patented July 14, 1931

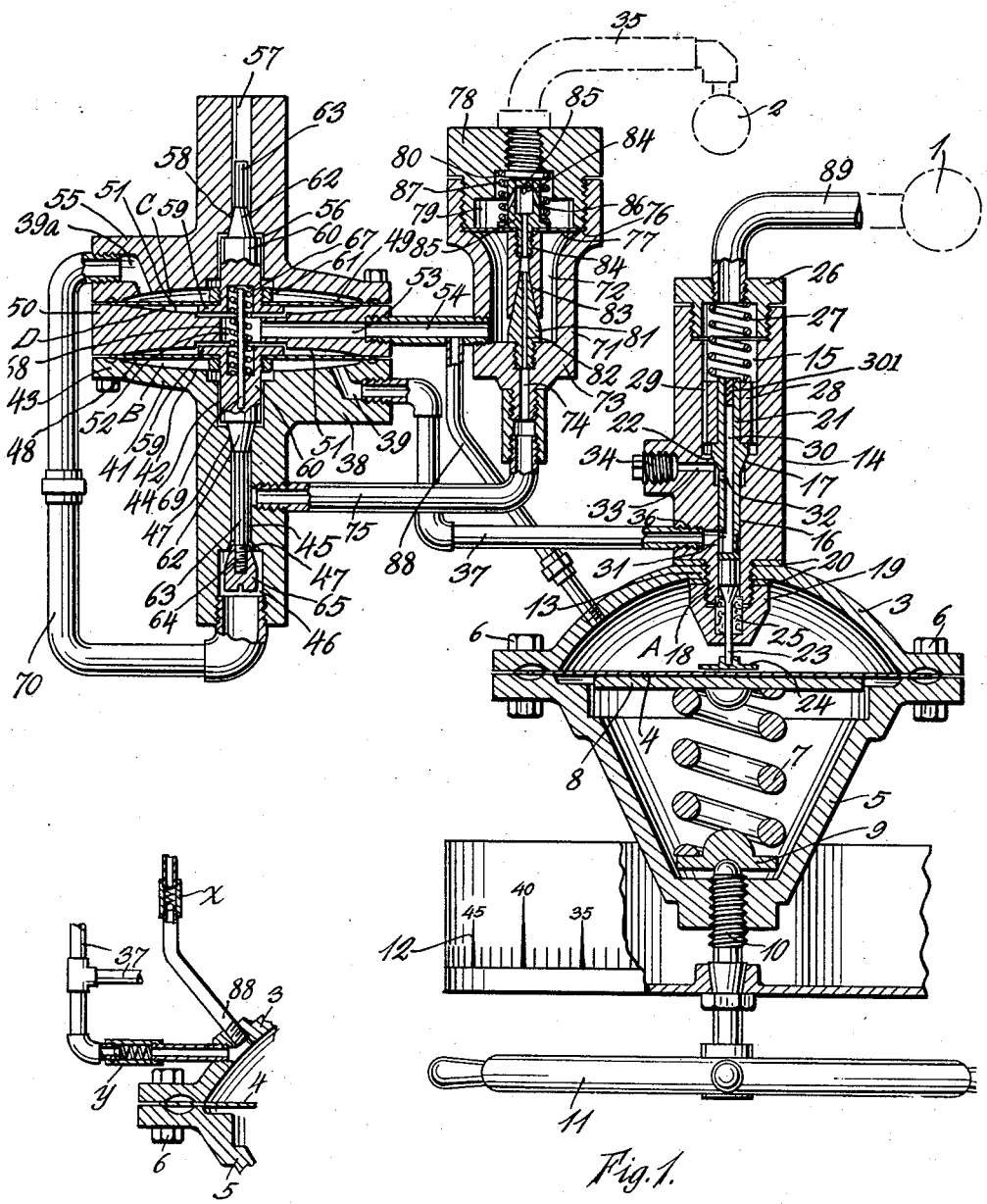

1,814,207

UNITED STATES PATENT OFFICE

WILLIAM L. DONKIN AND WORTH G. McCARTY, OF LONGMONT, COLORADO

AUTOMATIC INFLATING AND DEFLATING DEVICE

Application filed June 29, 1929. Serial No. 374,879.

This invention relates to improvements in devices for inflating and deflating automobile tires.

Pneumatic tires employed on automobiles must be very carefully inflated in order to obtain the best results and with the balloon tires now in common use a difference of pressure of a couple of pounds in the inflation, makes a big difference on the life of the tire. It is obvious that inflation should be carefully carried out and this necessitates the use of inflating devices that are reliable in their operation. It is also essential for a successful inflating device that it shall be so constructed that the inflation takes place at as high a speed as possible in order to prevent unnecessary delay and loss of time.

It is the object of this invention to produce an inflating and deflating device which shall be so constructed that when it is adjusted for a given pressure, it can be attached directly to the container to be inflated and if the pressure in the container is smaller than that for which the device is adjusted, it will immediately open up the passageway between the high pressure supply and the container so as to transfer air at a high speed to the latter. After inflation has proceeded for a short interval of time, the communication between the container and the high pressure source will be cut off and the pressure in the container will then be compared with the pressure for which the device is adjusted and if the pressure in the container is lower than that desired, communication will be again established between it and the high pressure source and this operation will be repeated until the pressure in the container has reached the value of the pressure for which the device is adjusted. If the pressure in the container exceeds the pressure for which the device is adjusted, it will be automatically deflated until the desired pressure is attained.

The above objects and others that may appear as the description proceeds are attained by means of a construction and an arrangement of parts that will now be described in detail, and for this purpose reference will be had to the accompanying drawings in which the preferred embodiment of the invention has been illustrated:

In the drawings,

Fig. 1 represents a section through the different parts of the mechanism which forms the subject of this invention; and Fig. 2 is a fragmentary sectional view showing a modification.

Numeral 1 indicates a storage tank in which air or other fluid is maintained under high pressure and 2 represents a container that is to be inflated to a predetermined pressure. These two containers are connected by a system of piping with which is associated a number of valves and pressure responsive devices so connected and related that they automatically control the flow of air from the high pressure source to the container 2. Numeral 3 represents a portion of a pressure responsive device having a flexible diaphragm 4. Part 3 is concave on one side and the concave surface, together with the diaphragm 4 forms an airtight chamber A, which will be referred to as the diaphragm chamber. A hollow conical member 5 is located on the other side of diaphragm 4 and the two parts are connected by means of bolts 6. A spring 7 extends between the plate 8 and the smaller plate 9, which is supported on the inner end of the adjusting screw 10. This adjusting screw can be rotated by means of a hand wheel 11 and has attached to it a scale 12 which is graduated to indicate the pressure for which the spring is adjusted. Member 3 has a central opening 13 with which the elongated valve member 14 is connected. Valve member 14 has a cylindrical opening 15, which communicates with a similar axially aligned opening 16 of smaller diameter. A conical valve seat 17 is formed at the juncture of openings 15 and 16. The lower end of member 14 is of reduced diameter as indicated at 18 and is threaded on its outer surface. A nut 19 is secured to the threaded end 18 on the inside of member 3 and serves to hold member 14 in place. Gaskets 20 are located one on each side of member 3, and when the nut 19 is tightened, an airtight joint is formed. Located within the openings 15 and 16 is a valve member 21. This valve member has a conical portion 22 whose sides are inclined to fit the conical valve seat 17 and which cooperate with this seat to make an airtight joint. Valve member 21 extends downwardly through opening 16 and terminates in a pin 23 which projects through an opening in the inner end of nut 19 and to the outer end of which a plate 24 is secured. The part 23 extends through the packing material 25 which is under compression and which makes an airtight joint at this point. When chamber A is inflated to the desired pressure, the upper surface of diaphragm 4 is spaced a short distance from the lower surface of plate 24. A plug 26 is threadedly connected with the upper end of member 14 and a spring 27 extends between the inner surface of plug 26 and the upper end of valve 21. A guide member 28 is secured to the upper end of the valve member 21 whose outer surface is provided with grooves 29 through which the air may pass. Valve member 21 is also provided with an axial opening 30, whose lower end terminates in a radial opening 31 and whose upper end is closed by means of a plug 301. Another radial opening 32 is also provided and this is so located that it is in communication with the opening 33 in member 14. The outer end of this opening has been shown as closed by plug 34, but this plug may be removed and replaced by a pipe which is placed in communication with the interior of the pipe 35. Member 14 is provided with a radial opening 36 with which the conduit 37 is connected. This conduit extends to member 38 and is connected with an opening 39 in this member. Member 38 has a central cylindrical part 40 and a circular end portion 41 whose upper surface 42 is slightly concave and terminates in a radial flange 43. Central portion 40 is provided with a recess 44, which extends inwardly from the concave surface and terminates in an opening 45 of somewhat smaller diameter. The lower end of this opening communicates with an opening 46 of somewhat larger diameter, which extends inwardly from the lower end of member 40. The upper and lower ends of opening 45 are provided with valve seats 47. A diaphragm 48 has its outer edge resting on the flange 40 and is separated from a similar diaphragm 49, by means of a circular spacer 50. This spacer has its opposite sides concave as indicated by numeral 51 and is provided with a central opening 52. It is also provided with a radial opening 53 to the outer end of which the pipe 54 is connected. Located above the upper diaphragm 49 is an end closing member 55, which is constructed substantially like that which is below diaphragm 48 and which has an opening 56 that communicates with a smaller opening 57 whose outer end is in communication with the atmosphere. A valve seat 58 is located at the inner end of opening 57. Diaphragms 48 and 49 are both provided with a central opening to which a valve is attached. These valves are substantially identical and are each provided with a head 59 which is located against the inner surface of the diaphragms and from which a central cylindrical portion 60 extends. The outer surfaces of the cylindrical portions 60 are threaded for the reception of clamping nuts 61, which serves to hold the valves attached to the diaphragms. The outer ends of the cylindrical portions 60 terminate in conical valve members 62 that cooperate with the valve seats 47 and 58. The valve surfaces 62, in turn terminate in cylindrical pins 63. The pin 63 which forms part of the valve member secured to diaphragm 48 extends entirely through the opening 45 and terminates in a threaded portion 64 to which valve member 65 is secured. This valve member has a conical surface 66 which is adapted to cooperate with the valve seat 47 to form a seal. The length of member 63 is such that only one of the valves at the ends of opening 45 will be closed at the same time, but the longitudinal movement which is permitted should not exceed one-thirty-second of an inch. The parts 60 are each provided with a cylindrical recess 67 between the bottoms of which the spring 68 extends. A pin 69 is secured to the valve member that is attached to diaphragm 48 and has its upper end in close proximity to the bottom of the opening 67 in the valve member secured to diaphragm 49. The length of pin 69 determines the relative inward movement of the two spaced diaphragms, and this movement must be sufficient to permit either of the valve surfaces 62 or 66 to move into operative engagement with either of the valve seats 47. A pipe 70 extends from the lower end of opening 46 to the opening 39a so as to put the opening 46 in communication with the diaphragm chamber above diaphragm 49. For convenience in describing the operation, the diaphragm chamber below diaphragm 48 will be designated by letter B, and the corresponding chamber above diaphragm 49 will be designated by C; while the space between the two diaphragms will be designated as chamber D.

A combined valve and injector is located between opening 45 and container 2 and is formed by a cylindrical member 71, having an opening 72 that extends inwardly from one end thereof. The lower end of member 71 is closed by an end wall 73 through which an opening 74 extends. A pipe 75 connects the opening 74 with opening 45 at a point between the spaced valve seats 47, and another pipe 54 connects opening 53 with the space 72 within member 71. The inner surface of member 71 is provided with a shoulder 76 on which the outer edge of flexible diaphragm 77 is supported. This diaphragm is held in place by the clamping action produced by the plug 78, which has a threaded connection with the inner surface of member 71 in the manner shown. Plug 78 is provided with a central recess formed by two sections 79 and 80 of different diameters. A nozzle 81 has its lower end secured to the end closure 73 and is provided with a central opening 82. The outer surface of this nozzle is conical and projects into the interior of a Venturi tube 83 with which it cooperates to form an injector whose function will hereinafter be more fully described. Tube 83 is secured to the lower surface of diaphragm 77 and is held in place by means of the threaded projection 84 of a hollow plug 85. This plug has an opening which connects the interior of tube 83 with the chamber 84. The upper end of this chamber is closed by a plug 85 and the sides are provided with openings 86 that connect the interior of chamber 84 with the interior of member 71. A spring 87 extends from the bottom of the recess 80 to the diaphragm and is tensioned so as to move the diaphragm downwardly and to move the inner surface of the Venturi tube into contact with the outer surface of the nozzle so as to form an airtight seal or valve at this point. A pipe 88 connects the interior of pipe 54 with diaphragm chamber A, and a pipe 89 extends from the opening in member 26 to the tank 1 that contains the compressed air.

Let us now assume that the parts have been constructed in the manner shown and described and that the storage tank 1 is provided with air compressed to one hundred and fifty pounds per square inch, and that it is desired to inflate the container 2 to a pressure of fifty pounds per square inch. The operator adjusts the tension of spring 7 so that a pressure of fifty pounds per square inch within chamber A will move the diaphragm 4 downwardly so as to separate it from the adjacent surface of plate 24. The space between the diaphragm and the lower surface of plate 24 must be very small, and it is of course possible to have these two surfaces in actual contact just so the pressure is not sufficient to unseat the valve 17. The pressure in chamber A is communicated through pipe 88 to the interior of pipe 54; to the space 72 and to chamber D, and this pressure tends to move diaphragms 48 and 49 outwardly, thereby holding the valve surfaces 62 in contact with their respective valve seats. If the chamber 79 above diaphragm 77 is in communication with the container 2 and the pressure in the latter is less than fifty pounds, this pressure will be communicated through openings 86, 82 and through pipes 75 and 70 to chamber C. The difference between the pressures in chambers 79 and 72 results in an upward flexing of the diaphragm 77, whereby the Venturi tube 83 is raised and separated from the nozzle; this permits air to flow from chambers A, D and 72 into chamber 79, thereby reducing the pressure in these chambers. As soon as the pressure in chamber A is reduced below fifty pounds, spring 7 moves the diaphragm 4 upwardly and unseats the valve at 17 and this permits high pressure air to flow through pipe 37 into the chamber B thereby moving diaphragm 48 upwardly and unseating valve 62 from the valve seat at the upper end of opening 45 and seating valve 65 against the seat 47 at the lower end of opening 45. High pressure air can now flow from the supply tank through pipes 89 and 37 into chamber B and from thence through opening 45 and through pipe 75 into the nozzle 81, from the opening in which it will emerge at a very high velocity and will pass upwardly through the opening 86 into chamber 84 and strike the inner surface of plug 85. The impulse due to the stream of air striking the plug 85 and reversing produces a force that tends to compress the spring 87 and to maintain the diaphragm in flexed position. The high velocity of the air as it emerges from the opening 82, produces a suction that tends to remove air from the interior of chamber 72 thereby still further reducing the pressure in this chamber. As chamber 72 is in communication with chambers D and A, the pressures within these chambers will also be reduced with the result that diaphragm 4 and diaphragm 48 will be subjected to an increased flexing pressure and therefore valve 22 and the valve at the upper end of opening 45 will be more securely retained in open position. It will be observed that the high pressure air from tank 1 is put in direct connection with the nozzle 81 through pipes 37 and 75 and that therefore a large quantity of air flows through this nozzle due to the very high pressure to which it is subjected. As there is considerable resistance to the flow of air through the pipe 25 and into the container 2, especially when an ordinary valve stem is employed, the pressure in pipe 35 will quickly build up to substantially the same pressure as that of the source with the result that air will flow from the interior of the Venturi tube, into chamber 72 and the pressure will therefore quickly increase in chambers A and B and as soon as the pressure in chamber A reaches a value of fifty pounds per square inch, valve 22 will seat, thereby cutting off the supply of high pressure air. As soon as this valve seats the pressure within pipes 35 and 75 and in chamber B will soon be equalized with that in container 2, with the result that valve 62 will move against the seat at the upper end of opening 45. The pressure in chamber 72 is now the same as in chamber A and as this is adjusted for fifty pounds per square inch, the pressure in chamber 72 will also be fifty pounds, and this is also true of chamber D. The pressure in chamber 79 will be the same as that in container 2 and therefore if this is less than fifty pounds per square inch, diaphragm 77 will again be flexed so as to open the seal between the nozzle 81 and the Venturi tube 83, thereby permitting the pressure in chamber A to be reduced to substantially the pressure in the container 2, whereby valve 22 will again be opened so as to supply more air to the container in the manner above described. If the conduit or hose 35 is applied to a container having a higher pressure than that for which the apparatus is adjusted the seal between the nozzle 81 and the Venturi tube will not be opened but the pressure will be transmitted through pipes 75 and 70 to chamber C and as this pressure is larger than the pressure in chamber D diaphragm 49 will flex downwardly and open the deflating valve which controls the outlet through opening 57 and this valve will be maintained in open position until the pressure on both sides of diaphragm 49 has been equalized. Owing to the fact that the pressure in the tube 35 is usually momentarily decreased when the chuck is applied to the valve stem, the pressure will instantly build up and when this occurs diaphragm 48 will flex upwardly and close the valve at the lower end of opening 45. If this valve is absolutely air tight, no deflation will take place because the air could not pass this valve. Valve member 65 is therefore provided with one or more fine scratches on its surface so that the valve will leak slightly when in closed position and therefore container 2 will deflate; the air passing from the container through pipe 75 and after passing this valve at the lower end of opening 45 will flow through pipe 70 into chamber C, the pressure in which will thereby be increased sufficiently to open the valve at 58. As soon as the container has deflated to the pressure of the air in chamber D the deflating valve at 58 will close. The rate at which the deflation takes place will vary with the amount of leakage past the valve at the lower end of opening 45 and this should therefore be as large as practical, as this valve holds the air from escaping by way of pipe 70 and the deflating valve 58 during inflation the leakage must be limited because if it is too great an unduly large amount of air will escape during inflation, which, of course, would be objectionable. Where large containers are to be inflated a pipe is run from opening 33 to conduit 35 and by this simple expedient the capacity is greatly increased.

After the pressure in chamber A has been reduced to such a value that valve 17 will be opened air will continue to flow until the pressure has again been increased to such a value that the diaphragm will flex sufficiently to permit the valve to close. In the embodiment described above the pressure in chamber A remains low as long as the injector functions, but as soon as the pressure in chamber 72 builds up, it is communicated to chamber A through pipe 37.

Attention is called to the fact that no air can flow from the reservoir 1 to the container 2 until valves 17 and 62 have been moved to open position which only occurs when the pressure in chamber A has been reduced below the predetermined value.

If we modify the construction shown in Fig. 2 by the addition of a check valve X in pipe 88 which check valve permits air to flow from chamber A to 72, but inhibits the flow of air in the opposite direction and then connect pipe 37 with chamber A through a conduit having a spring pressed check valve Y that prevents air from flowing from the chamber A but which permits air to flow from pipe 37 into chamber A when the pressure in pipe 37 is sufficient to raise the check valve from its seat. Check valve Y is adjusted so that it will open at some predetermined pressure, as, for example, at one hundred pounds per square inch. When valves X and Y have been added in the manner shown in Fig. 2, the device operates in a slightly different way, the operation being, briefly, as follows:

When the pressure is reduced in the air hose 35, it will open the seal between members 81 and 83 and permit the pressure in chambers 72 and A to reduce to the pressure in hose 35 and this will allow the diaphragm 4 to move and to open valve 17, whereby air from the storage tank 1 will begin to flow as above explained. The injector will now begin to function and this will still further reduce the pressure in chamber A. No air can flow from 72 to A and therefore the pressure in chamber A will not increase until the pressure in pipe 37 reaches such a value that it will unseat valve Y which we have assumed to take place at one hundred pounds. As soon as the pressure in pipe 37 reaches this value, air will flow into chamber A and flex the diaphragm thereby closing valve 17 and this valve will remain closed until the pressure in hose 35 is reduced to below the value to which the tire 4 is to be inflated. A series of pulsations will take place during the inflation and a pressure of one hundred pounds will be applied to the container 2 in rapid successions until its pressure is increased to that for which the parts are adjusted. In case the container gets slightly overinflated, it will be deflated to the proper pressure by the deflator. When the two valves shown in Fig. 2 are employed, the injector comprising parts 81, 83, 85 and 87 can be dispensed with if desired.

By the simple expedient of reducing the pressure in chamber A to that in the container 2, and then preventing air to enter the chamber until the pressure in pipe 37 reaches any desired value, for example one hundred pounds or more, the tire can be filled quickly as the pressure gradient is always very large.

From the above description it will be apparent that by means of the device which forms the subject of this invention, a container can be quickly inflated to any desired pressure by means which subjects it to a series of impulses produced by air at practically the pressure of the source and which therefore enables the inflation to take place rapidly. As the pressure in the container is measured between each impulse and as the impulses are shortened as the pressure in the container rises, there is very little danger of over inflation and if this should accidentally occur, the deflating mechanism will automatically become operative so as to reduce the pressure to the exact amount desired.

Having described the invention what is claimed as new is:

1. An inflating and deflating device comprising, in combination, a source of air under pressure, a container to be inflated to a predetermined pressure less than that of the source, means for making connection between the source of air under pressure and the container, means made operative when the pressure in the container is below a predetermined point for connecting it directly to the high pressure source, whereby air will be delivered to the container at a pressure higher than that to which it is to be inflated, means for shutting off the flow of air from the high pressure source, means for measuring the value of the air pressure in the container and for reestablishing the connection between the container and the high pressure source if the pressure in the container is below the predetermined pressure and means for connecting the interior of the container with the atmosphere when the pressure within the same is above the predetermined pressure.

2. An inflating and deflating device comprising, in combination, a source of air under pressure, a container to be inflated to a pressure lower than that of the source, piping for establishing connection between the container and the high pressure source, a valve for controlling the flow of air through the pipes, means for opening the valve when the pressure in the container is below the predetermined pressure to which the container is to be inflated, means for closing the valve so as to stop the flow of air, means for comparing the pressure in the container with the pressure to which it is to be inflated, and means for again opening the valve if it is lower than the desired pressure and for connecting the interior of the container with the atmosphere if it is higher than the desired pressure.

3. An inflating and deflating device comprising, in combination, a source of air under pressure, a container to be inflated to a predetermined pressure; piping through which the air is conveyed from the source to the container, a valve between said source and the piping, constrained to move in a closing direction, mechanism in controlling relation to the valve and inclusive of a diaphragm chamber and a diaphragm within the chamber, constrained and related to effect an opening adjustment of the valve; a valve located in the piping between the first valve and the container, constrained to move in a closing direction, a diaphragm connected with one end of said valve, a diaphragm chamber on each side of the last named diaphragm, the chamber on the same side as the valve being in communication with the interior of the piping, the chamber on the other side of the last named diaphragm being in communication with the first mentioned diaphragm chamber, a normally closed valve between the interior of the pipings and the last mentioned diaphragm chambers, means for opening the last named valve when the pressure in the container is lower than the pressure in the interconnected diaphragm chambers whereby the pressure in these chambers will be reduced to the value of the pressure in the container, thereby permitting the first mentioned diaphragm to move and open the first mentioned valve so as to permit air from the source to flow into the pipings and into the diaphragm chamber adjacent the second valve whereby the latter will be opened and direct connection established between the source and the container and means for producing a suction tending to further reduce the pressure in the interconnected diaphragm chambers when the air is flowing towards the container.

4. The combination with a source of air under pressure of piping through which air is conveyed from said source to a container, a valve between said source and piping constrained to move in a closing direction, means for moving the valve to open position upon the occurrence of certain pressure conditions, said means comprising a member having a chamber whose wall is formed in part by a flexible diaphragm, said valve having a portion located in close proximity to the inner surface of the diaphragm whereby the valve will be moved to open position when the diaphragm is moved inwardly, means comprising a spring for constraining the diaphragm to valve opening position; a valve located in the piping between the first mentioned valve and the container, one end of said last mentioned valve being attached to a diaphragm, means comprising a spring for constraining the last named valve to closed position, there being an air tight chamber on each side of the diaphragm, the chamber on the side adjacent the valve being in communication with the piping at a point between the two valves, a conduit connecting the chamber on the other side of the last named diaphragm with the interior of the piping between the second valve and the container, a normally closed valve in the conduit, means comprising a diaphragm for moving the last named valve to open position when the pressure in the container is below the desired pressure, a conduit connecting the interior of the first mentioned conduit with the first mentioned diaphragm chamber and means for reducing the pressure in the conduit when air is flowing towards the container.

5. In an inflating and deflating device for use in inflating a container to a given pressure from a source of air of a higher pressure comprising, in combination, a valve member having an opening therethrough, one end of which forms an inlet and the other an outlet, a valve located between the inlet and the outlet, constrained to move in a closing direction, means associated with the valve member for moving it to open position, said means comprising a hollow member having one side formed by a flexible diaphragm whereby a chamber of variable volume is formed, means comprising a spring for moving the diaphragm inwardly so as to reduce the volume of the chamber, means interposed between the diaphragm and the valve for opening the latter when the diaphragm moves inwardly beyond a predetermined position, a deflator having two spaced diaphragms and three diaphragm chambers, one of which is between the diaphragms and the others of which are on the outside of the diaphragms, a conduit extending from one of the outside diaphragm chambers to the outlet of the valve member, the two outside chambers being connected by a passage, said passage having two opposed valve seats spaced some distance apart, a movable valve member extending through the opening between the valve seats, said valve member being movable to a limited extent in the direction of its length and adapted to cooperate with the valve seats to form a seal, one end of said valve member being connected with the adjacent diaphragm, the wall of the other diaphragm chamber having an opening in communication with the atmosphere, said opening having a valve seat, a valve member in the opening and adapted to cooperate with the seat to form a seal, said valve member being attached to the adjacent diaphragm, a spring interposed between the diaphragms and tensioned to spread the diaphragms apart and move the valves against their seats, a combined valve and injector mechanism interposed between the container and that part of the passageway between the two opposed valve seats, the Venturi portion of the injector being mounted on a diaphragm and adapted to be moved with respect to the nozzle portion thereof, a spring having one end in engagement with the diaphragm and tensioned to move the Venturi tube towards the nozzle, a conduit connecting the space between the two diaphragms with interior of the combined valve and injector and a conduit connecting the interior of the last named conduit with the chamber adjacent the diaphragm that controls the first mentioned valve.

6. A combined inflator and deflator adapted for use in inflating a container to a given pressure from a source of compressed air of higher pressure comprising, in combination with the source of air under pressure of piping through which air is conveyed to the container, a valve between the source and the container, means for opening the valve when the pressure in the container is below a predetermined value whereby air may flow to the container, an injector located in the piping between the valve and the container, said injector having a stationary nozzle and a movable Venturi tube, said injector being located within a closed container, a deflator comprising two diaphragms separated from each other by a spacer, a closure member secured adjacent the outer surface of each diaphragm, each of said members having a concave surface that cooperates with the corresponding diaphragm to form a chamber of variable volume, one of the closure members having an elongated opening provided with opposed spaced valve seats, a valve member extending through the opening, said member having opposed valve surfaces adapted to cooperate with the valve seats so as to form seals, the distance between the valve surfaces being slightly greater than the distance between the valve seats whereby the valve member may be moved in the direction of its axis and whereby it will contact with only a single valve seat at one time, one of said valve seats being in the passageway between the source and the container, means for providing a passage from the opening having the two valve seats to the chamber at the outside of the other diaphragm and a valve controlled by the diaphragm forming one wall of the last named chamber for connecting the interior of the chamber with the atmosphere.

7. A combined inflator and deflator adapted for use in inflating a container to a given pressure from a source of compressed air of higher pressure comprising, in combination with the source of air under pressure of piping through which air is conveyed to the container, a valve between the source and the container, means for opening the valve when the pressure in the container is below a predetermined value whereby air may flow to the container, an injector located in the piping between the valve and the container, said injector having a relatively movable nozzle and Venturi tube, said injector being located within a closed container, a deflator comprising a chamber separated into two compartments by means of a flexible diaphragm, the wall of one of said chambers having a deflating opening in communication with the atmosphere, a valve member connected with the diaphragm and adapted to close the opening in the opening in the wall, a tubular member connecting the chamber on one side of the diaphragm with the interior of the chamber containing the injector, means for connecting the interior of the last named chamber with the pressure responsive valve opening device and means for connecting the chamber having the discharge opening with the passageway in the injector.

8. A combined inflator and deflator adapted for use in inflating a container to a given pressure from a source of compressed air of high pressure comprising, in combination with the source of air under pressure of piping through which air is conveyed to the container, a valve between the source and the container, means for opening the valve when the pressure in the container is below a predetermined value whereby air may flow to the container, an injector located in the piping between the valve and the container, said injector having a relatively movable nozzle and Venturi tube, said injector being located within a closed container, a deflator comprising a chamber separated into two compartments by means of a flexible diaphragm, the wall of one of said chambers having a deflating opening in communication with the atmosphere, a valve member connected with the diaphragm and adapted to close the opening in the opening in the wall, a tubular member connecting the chamber on one side of the diaphragm with the interior of the chamber containing the injector, means for connecting the interior of the last named chamber with the pressure responsive valve opening device, means for connecting the chamber having the discharge opening with the passageway in the injector and a leaky valve in the last named passageway.

9. An inflating and deflating device for inflating a container to a given pressure from a source of elastic fluid under a higher pressure comprising a system of piping for conducting fluid from the source to the container, a valve associated with the piping adjacent the source, means for normally maintaining the valve in closed position, means for opening the valve when the pressure in the container falls below a predetermined value, said piping having a passageway in communication with the atmosphere, a normally closed deflating valve for controlling the flow of air through said passageway to the atmosphere, a leaky valve interposed between the container and the last named valve, means for opening the deflating valve when the pressure in the container is above a predetermined value and means for closing the leaky valve when air flows from the source to the container.

10. An inflating and deflating device for inflating a container to a given pressure from a source of elastic fluid under a high pressure comprising a system of piping for conducting fluid from the source to the container, said piping having two branches, one of which is in communication with the container to be inflated and the other in communication with the atmosphere, a valve associated with the piping between the source and the branch, means for normally holding the valve in closed position, means for opening the valve when the pressure in the container is below the predetermined value, a deflating valve in the branch passageway, means for normally maintaining the deflating valve closed, means for opening the deflating valve when the pressure in the container is above the predetermined value, a leaky valve in the branch passageway between the main piping and the deflating valve and means for opening and closing said leaky valve in response to pressure conditions.

11. A mechanism for inflating and deflating a container to a given pressure from a storage tank containing air under a higher pressure comprising a system of piping for connecting the storage tank to the container, said piping having a branch that opens into the atmosphere, a normally closed control valve adjacent the storage tank, means responsive to the pressure in the container for opening the control valve when the pressure in the container is below the predetermined value, a deflating valve in the branch, means for opening the deflating valve when the pressure in the container is above the predetermined value, a second control valve in series with the first control valve, means for opening and closing the two control valves simultaneously and means for retarding the closing of the control valves.

12. A mechanism for inflating a container to a given pressure from a storage tank containing air at a higher pressure, comprising, a system of pipes for connecting the tank with the container, a control valve in the pipe, said valve controlling the flow of air to the container, a pressure responsive mechanism for opening the valve when the pressure on the container side thereof falls below a predetermined value, means for normally retaining the valve in closed position, the pressure responsive device having a pressure chamber, means for connecting the pressure chamber with the container whereby the pressures in the chamber and container become substantially equalized, a valve in the last named connection, said valve inhibiting the flow of air from the container to the pressure chamber but permitting free flow in the opposite direction, a conduit for connecting the pressure chamber with the air pipes on the container side of the control valve, and a spring pressed poppet valve in said conduit, the poppet valve preventing air from flowing from the pressure chamber, but permitting it to flow from the pipes to the pressure chamber when the pressure in the pipes rises above a predetermined value.

In testimony whereof we affix our signatures.

WILLIAM L. DONKIN.
WORTH G. McCARTY.